United States Patent
Cooley et al.

(10) Patent No.: US 9,495,144 B2
(45) Date of Patent: Nov. 15, 2016

(54) SYSTEMS AND METHODS FOR CONTROLLING APPLICATION UPDATES ACROSS A WIRELESS INTERFACE

(71) Applicant: Apple Inc., Cupertino, CA (US)

(72) Inventors: James W. Cooley, Seattle, WA (US); Neal E. Tucker, Seattle, WA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/563,487

(22) Filed: Dec. 8, 2014

(65) Prior Publication Data

US 2015/0095901 A1   Apr. 2, 2015

Related U.S. Application Data

(63) Continuation of application No. 11/956,253, filed on Dec. 13, 2007, now Pat. No. 8,914,786.

(51) Int. Cl.
*G06F 9/44* (2006.01)
*G06F 9/445* (2006.01)
*G06F 17/30* (2006.01)

(52) U.S. Cl.
CPC . *G06F 8/65* (2013.01); *G06F 8/60* (2013.01); *G06F 8/67* (2013.01); *G06F 17/30598* (2013.01)

(58) Field of Classification Search
CPC .............. G06F 8/61–8/68; G06F 8/60; G06F 17/30598
See application file for complete search history.

(56) References Cited

U.S. PATENT DOCUMENTS

| | | | |
|---|---|---|---|
| 5,463,725 A | 10/1995 | Henckel et al. | |
| 5,515,486 A | 5/1996 | Amro et al. | |
| 5,563,996 A | 10/1996 | Tchao | |
| 5,581,670 A | 12/1996 | Bier et al. | |
| 5,615,384 A | 3/1997 | Allard et al. | |
| 5,619,250 A | 4/1997 | McClellan et al. | |
| 5,627,842 A | 5/1997 | Brown et al. | |
| 5,677,708 A | 10/1997 | Matthews et al. | |
| 5,678,015 A | 10/1997 | Goh | |

(Continued)

FOREIGN PATENT DOCUMENTS

| | | |
|---|---|---|
| EP | 1 672 512 A1 | 6/2006 |
| WO | WO 2006132514 A1 | 12/2006 |

OTHER PUBLICATIONS

Christos Gkantsidis, Planet Scale Software Updates, 2006, pp. 1-12.*

(Continued)

*Primary Examiner* — Thuy Dao
*Assistant Examiner* — Mongbao Nguyen
(74) *Attorney, Agent, or Firm* — Morgan, Lewis & Bockius LLP

(57) ABSTRACT

Various embodiments of the present invention are directed to systems, methods, and computer program products for managing connections between a mobile device and a network server over a network connection in a bandwidth-efficient manner. In one embodiment, a mobile device includes a processor, and there are a plurality of services executed by the processor, each of the services receiving information updates over a network connection from a server. At least one update interval function executed by the processor assigns an update interval to each of the services, the update intervals governing when each of the respective services request updated information over the network connection.

13 Claims, 6 Drawing Sheets

(56) References Cited

U.S. PATENT DOCUMENTS

| | | |
|---|---|---|
| 5,694,537 A | 12/1997 | Montenegro et al. |
| 5,708,711 A * | 1/1998 | Rosauer et al. ............. 380/273 |
| 5,867,281 A | 2/1999 | Nozoe et al. |
| 5,886,697 A | 3/1999 | Naughton et al. |
| 5,896,566 A | 4/1999 | Averbuch et al. |
| 5,929,853 A | 7/1999 | Guha |
| 6,002,403 A | 12/1999 | Sugiyama et al. |
| 6,037,937 A | 3/2000 | Beaton et al. |
| 6,084,598 A | 7/2000 | Chekerylia |
| 6,160,553 A | 12/2000 | Robertson et al. |
| 6,166,738 A | 12/2000 | Robertson et al. |
| 6,167,567 A * | 12/2000 | Chiles .................. G06F 9/4448 709/221 |
| 6,208,335 B1 | 3/2001 | Gordon et al. |
| 6,229,542 B1 | 5/2001 | Miller |
| 6,239,803 B1 | 5/2001 | Driskell |
| 6,340,979 B1 | 1/2002 | Beaton et al. |
| 6,356,283 B1 | 3/2002 | Guedalia |
| 6,448,956 B1 | 9/2002 | Berman et al. |
| 6,463,343 B1 | 10/2002 | Emens et al. |
| 6,583,800 B1 | 6/2003 | Ridgley et al. |
| 6,618,063 B1 | 9/2003 | Kurtenbach |
| 6,639,613 B1 | 10/2003 | Nason et al. |
| 6,686,936 B1 | 2/2004 | Nason et al. |
| 6,687,901 B1 | 2/2004 | Imamatsu |
| 6,690,387 B2 | 2/2004 | Zimmerman et al. |
| 6,697,642 B1 | 2/2004 | Thomas |
| 6,700,612 B1 | 3/2004 | Anderson et al. |
| 6,710,788 B1 | 3/2004 | Freach et al. |
| 6,717,596 B1 | 4/2004 | Nason et al. |
| 6,724,400 B1 | 4/2004 | Anderson |
| 6,731,316 B2 | 5/2004 | Herigstad et al. |
| 6,745,224 B1 * | 6/2004 | D'Souza ................ G06F 9/485 707/999.003 |
| 6,765,559 B2 | 7/2004 | Hayakawa |
| 6,775,659 B2 | 8/2004 | Clifton-Bligh |
| 6,820,259 B1 * | 11/2004 | Kawamata ................ G06F 8/61 717/173 |
| 6,826,614 B1 | 11/2004 | Hanmann et al. |
| 6,854,016 B1 | 2/2005 | Kraenzel et al. |
| 6,879,332 B2 | 4/2005 | Decombe |
| 6,879,729 B2 | 4/2005 | Kamath et al. |
| 6,883,143 B2 | 4/2005 | Driskell |
| 6,888,554 B1 | 5/2005 | Decombe |
| 6,961,731 B2 | 11/2005 | Holbrook |
| 7,024,491 B1 | 4/2006 | Hanmann et al. |
| 7,036,091 B1 | 4/2006 | Nguyen |
| 7,146,574 B2 | 12/2006 | Goldthwaite et al. |
| 7,149,982 B1 | 12/2006 | Duperrouzel et al. |
| 7,155,528 B2 | 12/2006 | Tam |
| 7,165,250 B2 | 1/2007 | Lyons |
| 7,194,551 B1 | 3/2007 | Moll et al. |
| 7,216,305 B1 | 5/2007 | Jaeger |
| 7,228,507 B2 | 6/2007 | Good et al. |
| D549,713 S | 8/2007 | Lewin et al. |
| 7,274,926 B1 | 9/2007 | Laumen et al. |
| 7,296,243 B2 | 11/2007 | Lira |
| 7,327,349 B2 | 2/2008 | Robbins et al. |
| 7,353,034 B2 | 4/2008 | Haney |
| 7,356,777 B2 | 4/2008 | Borchardt et al. |
| 7,418,671 B2 | 8/2008 | Hama et al. |
| 7,437,169 B2 | 10/2008 | Khoury et al. |
| 7,441,207 B2 | 10/2008 | Filner et al. |
| 7,447,520 B2 | 11/2008 | Scott |
| 7,463,631 B2 | 12/2008 | Bao et al. |
| 7,484,175 B2 | 1/2009 | Kirkland |
| 7,584,467 B2 | 9/2009 | Wickham et al. |
| 7,596,784 B2 | 9/2009 | Abrams et al. |
| 7,600,192 B1 | 10/2009 | Hashimoto et al. |
| 7,600,201 B2 | 10/2009 | Endler et al. |
| 7,660,581 B2 | 2/2010 | Ramer et al. |
| 7,707,570 B2 | 4/2010 | Yoshimura et al. |
| 7,716,662 B2 | 5/2010 | Seiden |
| 7,769,144 B2 | 8/2010 | Yao et al. |
| 7,783,733 B1 | 8/2010 | Yip et al. |
| 7,865,828 B1 | 1/2011 | Hanson, II et al. |
| 7,930,354 B2 | 4/2011 | Vuong et al. |
| 7,949,353 B2 | 5/2011 | Pollock et al. |
| 7,954,124 B2 | 5/2011 | Rambo |
| 8,000,457 B2 | 8/2011 | Harper |
| 8,073,474 B1 | 12/2011 | Cooley et al. |
| 8,237,712 B2 | 8/2012 | Fagans |
| 8,275,659 B2 | 9/2012 | Ellis et al. |
| 8,775,964 B2 | 7/2014 | Hayashi et al. |
| 2001/0030662 A1 | 10/2001 | Ohkawa et al. |
| 2001/0030667 A1 | 10/2001 | Kelts |
| 2001/0032221 A1 | 10/2001 | Anwar |
| 2001/0035885 A1 | 11/2001 | Iron et al. |
| 2001/0045965 A1 | 11/2001 | Orbanes et al. |
| 2001/0056496 A1 | 12/2001 | Tam |
| 2002/0000998 A1 | 1/2002 | Scott et al. |
| 2002/0002581 A1 | 1/2002 | Siddiqui |
| 2002/0015064 A1 | 2/2002 | Robotham et al. |
| 2002/0016959 A1 | 2/2002 | Barton et al. |
| 2002/0022516 A1 | 2/2002 | Forden |
| 2002/0032696 A1 | 3/2002 | Takiguchi et al. |
| 2002/0051017 A1 | 5/2002 | Wishoff |
| 2002/0054172 A1 | 5/2002 | Berman et al. |
| 2002/0059604 A1 | 5/2002 | Papagan et al. |
| 2002/0060699 A1 | 5/2002 | D'Agostini |
| 2002/0067379 A1 | 6/2002 | Kenyon et al. |
| 2002/0069284 A1 | 6/2002 | Slemmer et al. |
| 2002/0069298 A1 | 6/2002 | Birkler et al. |
| 2002/0072353 A1 | 6/2002 | Kim |
| 2002/0089549 A1 | 7/2002 | Munro et al. |
| 2002/0100063 A1 | 7/2002 | Herigstad et al. |
| 2002/0107930 A1 | 8/2002 | Itoh |
| 2002/0112082 A1 | 8/2002 | Ko et al. |
| 2002/0113778 A1 | 8/2002 | Rekimoto et al. |
| 2002/0113816 A1 | 8/2002 | Mitchell et al. |
| 2002/0126121 A1 | 9/2002 | Robbins |
| 2002/0144233 A1 | 10/2002 | Chong et al. |
| 2002/0144273 A1 | 10/2002 | Reto |
| 2002/0145620 A1 | 10/2002 | Smith et al. |
| 2002/0152222 A1 | 10/2002 | Holbrook |
| 2002/0171691 A1 | 11/2002 | Currans et al. |
| 2002/0178022 A1 | 11/2002 | Anderson et al. |
| 2002/0188676 A1 | 12/2002 | Iai et al. |
| 2002/0188937 A1 | 12/2002 | Webster et al. |
| 2003/0001898 A1 | 1/2003 | Bernhardson |
| 2003/0011635 A1 | 1/2003 | Hasha et al. |
| 2003/0016247 A1 | 1/2003 | Lai et al. |
| 2003/0020671 A1 | 1/2003 | Santoro et al. |
| 2003/0043200 A1 | 3/2003 | Faieta et al. |
| 2003/0055908 A1 | 3/2003 | Brown et al. |
| 2003/0065738 A1 | 4/2003 | Yang et al. |
| 2003/0065941 A1 | 4/2003 | Ballard et al. |
| 2003/0080998 A1 | 5/2003 | Gonzalez |
| 2003/0081621 A1 | 5/2003 | Godfrey et al. |
| 2003/0095527 A1 | 5/2003 | Shanbhag |
| 2003/0163551 A1 | 8/2003 | Riordan |
| 2003/0169282 A1 | 9/2003 | Herigstad et al. |
| 2003/0177179 A1 | 9/2003 | Jones et al. |
| 2003/0177198 A1 | 9/2003 | Yabe et al. |
| 2003/0179237 A1 | 9/2003 | Nelson et al. |
| 2003/0179239 A1 | 9/2003 | Lira |
| 2003/0187938 A1 | 10/2003 | Mousseau et al. |
| 2003/0189597 A1 | 10/2003 | Anderson et al. |
| 2003/0195950 A1 | 10/2003 | Huang et al. |
| 2003/0197736 A1 | 10/2003 | Murphy |
| 2003/0222917 A1 | 12/2003 | Trantow |
| 2003/0233648 A1 | 12/2003 | Earl et al. |
| 2004/0027395 A1 | 2/2004 | Lection et al. |
| 2004/0046795 A1 | 3/2004 | Josephson et al. |
| 2004/0046799 A1 | 3/2004 | Gombert et al. |
| 2004/0048607 A1 | 3/2004 | Kim |
| 2004/0073045 A1 | 4/2004 | Imamatsu |
| 2004/0109436 A1 * | 6/2004 | Vargas et al. .................. 370/350 |
| 2004/0111612 A1 | 6/2004 | Choi et al. |
| 2004/0135824 A1 | 7/2004 | Fitzmaurice |
| 2004/0141010 A1 | 7/2004 | Fitzmaurice |
| 2004/0162882 A1 | 8/2004 | Mora |
| 2004/0174400 A1 | 9/2004 | Herigstad et al. |
| 2004/0186897 A1 | 9/2004 | Knauerhase et al. |

(56) References Cited

U.S. PATENT DOCUMENTS

| | | |
|---|---|---|
| 2004/0203803 A1 | 10/2004 | Taylor |
| 2004/0210628 A1 | 10/2004 | Inkinen et al. |
| 2004/0214609 A1 | 10/2004 | Sagi et al. |
| 2004/0215755 A1* | 10/2004 | O'Neill ............... G06F 8/65 709/223 |
| 2004/0221243 A1 | 11/2004 | Twerdahl et al. |
| 2004/0221289 A1 | 11/2004 | D'Souza et al. |
| 2004/0233219 A1 | 11/2004 | Aguera y Arcas |
| 2004/0255287 A1 | 12/2004 | Zhang et al. |
| 2004/0257340 A1 | 12/2004 | Jawerth |
| 2004/0261071 A1 | 12/2004 | Chuang et al. |
| 2004/0268413 A1 | 12/2004 | Reid et al. |
| 2005/0005241 A1 | 1/2005 | Hunleth et al. |
| 2005/0022139 A1 | 1/2005 | Gettman et al. |
| 2005/0027408 A1 | 2/2005 | Donoghue et al. |
| 2005/0044058 A1 | 2/2005 | Matthews et al. |
| 2005/0050476 A1 | 3/2005 | SanGiovanni |
| 2005/0057524 A1 | 3/2005 | Hill et al. |
| 2005/0060365 A1 | 3/2005 | Robinson et al. |
| 2005/0060374 A1 | 3/2005 | Phillips |
| 2005/0064887 A1 | 3/2005 | Bengtsson et al. |
| 2005/0076303 A1 | 4/2005 | Vaananen et al. |
| 2005/0076333 A1 | 4/2005 | Leclair et al. |
| 2005/0086612 A1 | 4/2005 | Gettman et al. |
| 2005/0091596 A1 | 4/2005 | Anthony et al. |
| 2005/0091651 A1 | 4/2005 | Curtis et al. |
| 2005/0102351 A1 | 5/2005 | Jiang et al. |
| 2005/0120346 A1 | 6/2005 | Sprigg |
| 2005/0134578 A1 | 6/2005 | Chambers et al. |
| 2005/0138570 A1 | 6/2005 | Good et al. |
| 2005/0147130 A1 | 7/2005 | Hurwitz et al. |
| 2005/0177827 A1 | 8/2005 | Fong et al. |
| 2005/0183041 A1 | 8/2005 | Chiu et al. |
| 2005/0188369 A1* | 8/2005 | Evers ............... G06F 8/60 717/174 |
| 2005/0195154 A1 | 9/2005 | Robbins et al. |
| 2005/0197763 A1 | 9/2005 | Robbins et al. |
| 2005/0210399 A1 | 9/2005 | Filner et al. |
| 2005/0210410 A1 | 9/2005 | Ohwa et al. |
| 2005/0210459 A1 | 9/2005 | Henderson et al. |
| 2005/0216858 A1 | 9/2005 | Fabritius |
| 2005/0223341 A1 | 10/2005 | Repka |
| 2005/0229102 A1 | 10/2005 | Watson et al. |
| 2005/0240965 A1 | 10/2005 | Watson et al. |
| 2005/0257214 A1 | 11/2005 | Moshir et al. |
| 2005/0268247 A1 | 12/2005 | Baneth |
| 2005/0270288 A1 | 12/2005 | Arcas |
| 2005/0270311 A1 | 12/2005 | Rasmussen et al. |
| 2006/0010395 A1 | 1/2006 | Aaltonen |
| 2006/0020938 A1* | 1/2006 | Elcock ............... G06F 8/65 717/178 |
| 2006/0026536 A1 | 2/2006 | Hotelling et al. |
| 2006/0030891 A1* | 2/2006 | Saltzstein ......... G06F 19/3412 607/5 |
| 2006/0046706 A1 | 3/2006 | Lin et al. |
| 2006/0047775 A1 | 3/2006 | Bruck et al. |
| 2006/0053388 A1 | 3/2006 | Michelman |
| 2006/0067502 A1 | 3/2006 | Bamrah et al. |
| 2006/0073812 A1 | 4/2006 | Punaganti Venkata et al. |
| 2006/0084450 A1 | 4/2006 | Dam Nielsen et al. |
| 2006/0089152 A1 | 4/2006 | Mahonen |
| 2006/0106806 A1* | 5/2006 | Sperling ............ G06F 8/65 |
| 2006/0112380 A1 | 5/2006 | Heller et al. |
| 2006/0123183 A1 | 6/2006 | Koivisto et al. |
| 2006/0130035 A1* | 6/2006 | Shih ............... G06F 8/65 717/168 |
| 2006/0130053 A1 | 6/2006 | Buljore et al. |
| 2006/0136964 A1 | 6/2006 | Diez et al. |
| 2006/0155785 A1 | 7/2006 | Berry et al. |
| 2006/0156228 A1 | 7/2006 | Gallo et al. |
| 2006/0161863 A1 | 7/2006 | Gallo |
| 2006/0184927 A1 | 8/2006 | Deblaquiere et al. |
| 2006/0190833 A1 | 8/2006 | SanGiovanni et al. |
| 2006/0230398 A1 | 10/2006 | Yokota |
| 2006/0271618 A1 | 11/2006 | Kokubo et al. |
| 2007/0019793 A1 | 1/2007 | Cheng |
| 2007/0060206 A1 | 3/2007 | Dam Nielsen et al. |
| 2007/0066283 A1 | 3/2007 | Haar et al. |
| 2007/0073665 A1 | 3/2007 | Naganuma et al. |
| 2007/0079291 A1 | 4/2007 | Roth |
| 2007/0080954 A1 | 4/2007 | Griffin et al. |
| 2007/0082707 A1 | 4/2007 | Flynt et al. |
| 2007/0087756 A1 | 4/2007 | Hoffberg |
| 2007/0094655 A1* | 4/2007 | Rostampour ......... G06F 8/60 717/168 |
| 2007/0101328 A1* | 5/2007 | Baron .............. G06F 8/60 718/100 |
| 2007/0104158 A1 | 5/2007 | Liang et al. |
| 2007/0106979 A1* | 5/2007 | Felts ............... G06F 8/60 717/124 |
| 2007/0118617 A1* | 5/2007 | Lee ................ G06F 8/65 709/219 |
| 2007/0136264 A1 | 6/2007 | Tran |
| 2007/0152961 A1 | 7/2007 | Dunton et al. |
| 2007/0156706 A1 | 7/2007 | Hayes |
| 2007/0157232 A1 | 7/2007 | Dunton et al. |
| 2007/0173268 A1 | 7/2007 | Le Bodic et al. |
| 2007/0184820 A1 | 8/2007 | Marshall |
| 2007/0192739 A1 | 8/2007 | Hunleth et al. |
| 2007/0192763 A1* | 8/2007 | Helvick ............. G06F 8/65 717/168 |
| 2007/0198698 A1 | 8/2007 | Boyd et al. |
| 2007/0201502 A1 | 8/2007 | Abramson |
| 2007/0229462 A1 | 10/2007 | Huynh et al. |
| 2007/0265025 A1 | 11/2007 | Commarford et al. |
| 2007/0277028 A1* | 11/2007 | Cates ............... G06F 8/60 713/2 |
| 2007/0294380 A1* | 12/2007 | Natarajan ........... G06F 8/65 709/223 |
| 2007/0294640 A1 | 12/2007 | Eskelinen et al. |
| 2008/0005732 A1 | 1/2008 | Coon |
| 2008/0027669 A1 | 1/2008 | Escott |
| 2008/0049714 A1 | 2/2008 | Commarford et al. |
| 2008/0052701 A1 | 2/2008 | Abernethy et al. |
| 2008/0066113 A1 | 3/2008 | Skelly |
| 2008/0127088 A1* | 5/2008 | Harmsen ............ G06F 8/60 717/121 |
| 2008/0132254 A1 | 6/2008 | Graham et al. |
| 2008/0141261 A1 | 6/2008 | Machida |
| 2008/0154805 A1 | 6/2008 | Gurumoorthy et al. |
| 2008/0162649 A1 | 7/2008 | Lee et al. |
| 2008/0168391 A1 | 7/2008 | Robbin et al. |
| 2008/0209317 A1 | 8/2008 | SanGiovanni et al. |
| 2008/0216022 A1 | 9/2008 | Lorch et al. |
| 2008/0274723 A1 | 11/2008 | Hook et al. |
| 2008/0320050 A1 | 12/2008 | Chan |
| 2009/0031299 A1 | 1/2009 | Karstens |
| 2009/0042599 A1 | 2/2009 | Scott |
| 2009/0055683 A1 | 2/2009 | Wells et al. |
| 2009/0094107 A1 | 4/2009 | Torkelson et al. |
| 2009/0100419 A1* | 4/2009 | Childress ........... G06F 8/65 717/171 |
| 2009/0138477 A1 | 5/2009 | Piira et al. |
| 2010/0099441 A1 | 4/2010 | Agarwal et al. |
| 2010/0113072 A1 | 5/2010 | Gibson et al. |
| 2012/0174025 A1 | 7/2012 | SanGiovanni et al. |
| 2012/0207098 A1 | 8/2012 | Cooley et al. |
| 2012/0208568 A1 | 8/2012 | Cooley |
| 2012/0210306 A1 | 8/2012 | Tucker et al. |
| 2012/0210310 A1 | 8/2012 | Cooley et al. |
| 2012/0210313 A1 | 8/2012 | Cooley et al. |
| 2014/0051423 A1 | 2/2014 | Marsden et al. |

OTHER PUBLICATIONS

James Cowling, Dynamic Location Management in Heterogeneous Cellular Networks, 2004, pp. 8-43.*

David L. Mills, Adaptive Hybrid Clock Discipline Algorithm for the Network Time Protocol, 1998, pp. 1-12.*

Afonso, "Dynamic Channels: a New Development Methodology for Mobile Computer Applications," Department of Information, Mar. 1998, 22 pages.

(56) References Cited

OTHER PUBLICATIONS

Alcala, UbiLoc: A System for Locating Mobile Devices using Mobile Devices, Otto-von-Guericke-University of Magdeburg, Department of Computer Science Institute of Technical and Business Information Systems, Mar. 1, 2004, 6 pages.
Alefeld, "Interval analysis: theory and applications," Journal of Computational and Applied Mathematics, Aug. 1999, 44 pages.
GeoPhoenix Inc., Solutions, http://www.geophoenix.com/solutions.htm, Oct. 13, 2005, 2 pages.
Kunkel, "Digital Dreams, The Work of the Sony Design Center," Universe Publishing, NY, NY, Sep. 4, 1999, 3 pages.
Wang, et al., "IPTV STB Software Update Scheme Based on SNMP," IEEE, May 7, 2006, 4 pages.
Windsor Interfaces Inc., Natural Software for Real People, Mar. 29, 2005, 1 page.
Yang, et al., "The Design and Implementation of Koreasat DBS Set-Top-Box Software," International Conference on Information, Communications and Signal Processing, ICICS '97, Sep. 9-12, 1997, 5 pages.
Office Action, dated Aug. 2, 2012, received in U.S. Appl. No. 11/690,582, 17 pages.
Final Office Action, dated Jan. 18, 2013, received in U.S. Appl. No. 11/690,582, 22 pages.
Office Action, dated Feb. 26, 2014, received in U.S. Appl. No. 11/690,582, 22 pages.
Final Office Action, dated Oct. 21, 2014, received in U.S. Appl. No. 11/690,582, 26 pages.
Office Action, dated Apr. 9, 2015, received in U.S. Appl. No. 11/690,582, 15 pages.
Office Action, dated Sep. 9, 2011, received in U.S. Appl. No. 11/690,591, 21 pages.
Final Office Action, dated Feb. 24, 2012, received in U.S. Appl. No. 11/690,591, 24 pages.
Office Action, dated Apr. 11, 2013, received in eceived in U.S. Appl. No. 11/690,591, 24 pages.
Final Office Action, dated Dec. 10, 2013, received in U.S. Appl. No. 11/690,591, 32 pages.
Office Action, dated Jul. 3, 2014, received in eceived in U.S. Appl. No. 11/690,591, 28 pages.
Final Office Action, dated Feb. 17, 2015, received in U.S. Appl. No. 11/690,591, 27 pages.
Office Action, dated Oct. 14, 2009, received in U.S. Appl. No. 11/690,602, 13 pages.
Office Action, dated Nov. 15, 2010, received in U.S. Appl. No. 11/690,602, 11 pages.
Office Action, dated Apr. 22, 2011, received in U.S. Appl. No. 11/690,602, 11 pages.
Notice of Allowance, dated Oct. 3, 2011, received in U.S. Appl. No. 11/690,602, 12 pages.
Office Action, dated Apr. 13, 2012, received in U.S. Appl. No. 12/327,690, 12 pages.
Final Office Action, dated Jan. 18, 2013, received in U.S. Appl. No. 12/327,690, 22 pages.
Office Action, dated Feb. 12, 2014, received in U.S. Appl. No. 12/327,690, 12 pages.
Final Office Action, dated Oct. 28, 2014, received in U.S. Appl. No. 12/327,690, 13 pages.
Office Action, dated Aug. 5, 2011, received in U.S. Appl. No. 12/327,684, 17 pages.
Office Action, dated Feb. 2, 2012, received in U.S. Appl. No. 12/327,684, 15 pages.
Final Office Action, dated Dec. 6, 2012, received in U.S. Appl. No. 12/327,684, 16 pages.
Notice of Allowance, dated May 23, 2013, received in U.S. Appl. No. 12/327,684, 15 pages.
Office Action, dated Sep. 21, 2007, received in U.S. Appl. No. 11/061,218, 15 pages.
Final Office Action, dated Mar. 26, 2008, received in U.S. Appl. No. 11/061,218, 19 pages.
Office Action, dated Sep. 18, 2008, received in U.S. Appl. No. 11/061,218, 19 pages.
Office Action, dated Feb. 26, 2009, received in U.S. Appl. No. 11/061,218, 20 pages.
Final Office Action, dated Aug. 19, 2009, received in U.S. Appl. No. 11/061,218, 21 pages.
Office Action, dated Feb. 3, 2010, received in U.S. Appl. No. 11/061,218, 19 pages.
Final Office Action, dated Sep. 2, 2010, received in U.S. Appl. No. 11/061,218, 28 pages.
Office Action, dated Feb. 17, 2011, received in U.S. Appl. No. 11/061,218, 29 pages.
Final Office Action, dated Jun. 8, 2011, received in U.S. Appl. No. 11/061,218, 32 pages.
Office Action, dated May 9, 2012, received in U.S. Appl. No. 11/061,218, 29 pages.
Final Office Action, dated Mar. 15, 2013, received in U.S. Appl. No. 11/061,218, 23 pages.
Office Action, dated Sep. 25, 2013, received in U.S. Appl. No. 11/061,218, 24 pages.
Notice of Allowance, dated May 23, 2014, received in U.S. Appl. No. 11/061,218, 16 pages.
Office Action, dated May 31, 2012, received in U.S. Appl. No. 13/341,719, 16 pages.
Final Office Action, dated May 3, 2013, received in U.S. Appl. No. 13/341,719, 19 pages.
Office Action, dated Nov. 19, 2013, received in U.S. Appl. No. 13/341,719, 23 pages.
Final Office Action, dated Jul. 8, 2014, received in U.S. Appl. No. 13/341,719, 20 pages.
Office Action, dated Mar. 3, 2015, received in U.S. Appl. No. 13/341,719, 15 pages.
Office Action, dated Jun. 9, 2010, received in U.S. Appl. No. 11/681,164, 19 pages.
Final Office Action, dated Nov. 29, 2010, received in U.S. Appl. No. 11/681,164, 17 pages.
Office Action, dated Mar. 14, 2014, received in U.S. Appl. No. 11/681,164, 19 pages.
Final Office Action, dated Dec. 4, 2014, received in U.S. Appl. No. 11/681,164, 20 pages.
International Search Report and Written Opinion, dated Jul. 23, 2008, received in International Patent Application No. PCT/US2008/053119, which corresponds with U.S. Appl. No. 11/681,164, 9 pages.
International Preliminary Report on Patentability, dated Aug. 26, 2009, received in International Patent Application No. PCT/US2008/053119, which corresponds with U.S. Appl. No. 11/681,164, 7 pages.
Office Action, dated Jun. 9, 2011, received in U.S. Appl. No. 11/956,253, 15 pages.
Final Office Action, dated Dec. 22, 2011, received in U.S. Appl. No. 11/956,253, 19 pages.
Office Action, dated May 14, 2012, received in U.S. Appl. No. 11/956,253, 18 pages.
Final Office Action, dated Dec. 17, 2012, received in U.S. Appl. No. 11/956,253, 21 pages.
Office Action, dated May 3, 2013, received in U.S. Appl. No. 11/956,253, 24 pages.
Final Office Action, dated Nov. 22, 2013, received in U.S. Appl. No. 11/956,253, 24 pages.
Notice of Allowance, dated Aug. 8, 2014, received in U.S. Appl. No. 11/956,253, 16 pages.
Final Office Action, dated Oct. 8, 2015, received in U.S. Appl. No. 13/341,719, 18 pages.

\* cited by examiner

SYSTEMS AND METHODS FOR CONTROLLING APPLICATION UPDATES ACROSS A WIRELESS INTERFACE

CROSS-REFERENCE TO RELATED APPLICATIONS

This patent application is a continuation of U.S. patent application Ser. No. 11/956,253, filed Dec. 13, 2007, entitled "SYSTEMS AND METHODS FOR CONTROLLING APPLICATION UPDATES ACROSS A WIRELESS INTERFACE." This application is also related to concurrently filed, co-pending, and commonly-assigned U.S. patent application Ser. No. 11/690,582, filed Mar. 23, 2007, entitled "SYSTEMS AND METHODS FOR CONTROLLING APPLICATION UPDATES ACROSS A WIRELESS INTERFACE," U.S. patent application Ser. No. 11/690,591 filed Mar. 23, 2007, entitled "SYSTEMS AND METHODS FOR COORDINATING THE UPDATING OF APPLICATIONS ON A COMPUTING DEVICE," and U.S. patent application Ser. No. 11/690,602 filed Mar. 23, 2007, entitled "SYSTEMS AND METHODS FOR CONTROLLING GROUP MESSAGING," the disclosures of all of which are incorporated herein by reference.

TECHNICAL FIELD

This disclosure relates to wireless bandwidth management and more particularly to systems and methods for adaptive bandwidth management in wireless communication systems and even more particularly to systems and methods for efficiently updating applications that reside on a wireless device.

BACKGROUND

In many situations, such as, for example, when it is required to update or change an application that is running on a mobile device, the updated or new information typically is located on the network side of the wireless interface. Thus that information must then be transmitted across the wireless interface to the device, such as a cell phone, where the application resides.

Several problems exist when attempting to manage such application updates. These problems stem from several factors, one of which is that a typical mobile wireless network has high latency and relatively low bandwidth. In addition, the wireless interface is subject to drop-outs and thus often there is difficulty maintaining a channel. Also, the use of the wireless interface causes battery drain on the mobile device and thus there is always concern as to when transmission occurs and for how long.

An additional set of problems exist when the data exchange is via the HTTP protocol which is a client initiated protocol. In this instance, the client being the mobile device. Thus, the situation exists that the update data resides in the network while the connection must be initiated from the mobile device, all while conserving bandwidth and battery life of the mobile device.

BRIEF SUMMARY

The present invention is directed to systems, methods, and computer program products providing client-side setting of application update intervals. In one embodiment, a single persistent wireless interface connection is maintained in a manner that allows for multiplexing several services over that connection. One or more client side interval update functions calculate appropriate update intervals for the various services in a dynamic manner. Therefore, each service that communicates using the network connection has an update interval associated therewith. By managing the data transfer in accordance with the update intervals, the bandwidth of the total data transfer across the interface is managed so as to conserve battery life and minimize the bandwidth required at any point in time. Update intervals can also be used to maximize cost efficiency by, e.g., increasing intervals or stopping automatic updates altogether when network data costs rise. From time to time, the update interval of any given type of data can be adjusted dynamically depending upon one or more factors that can change over time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
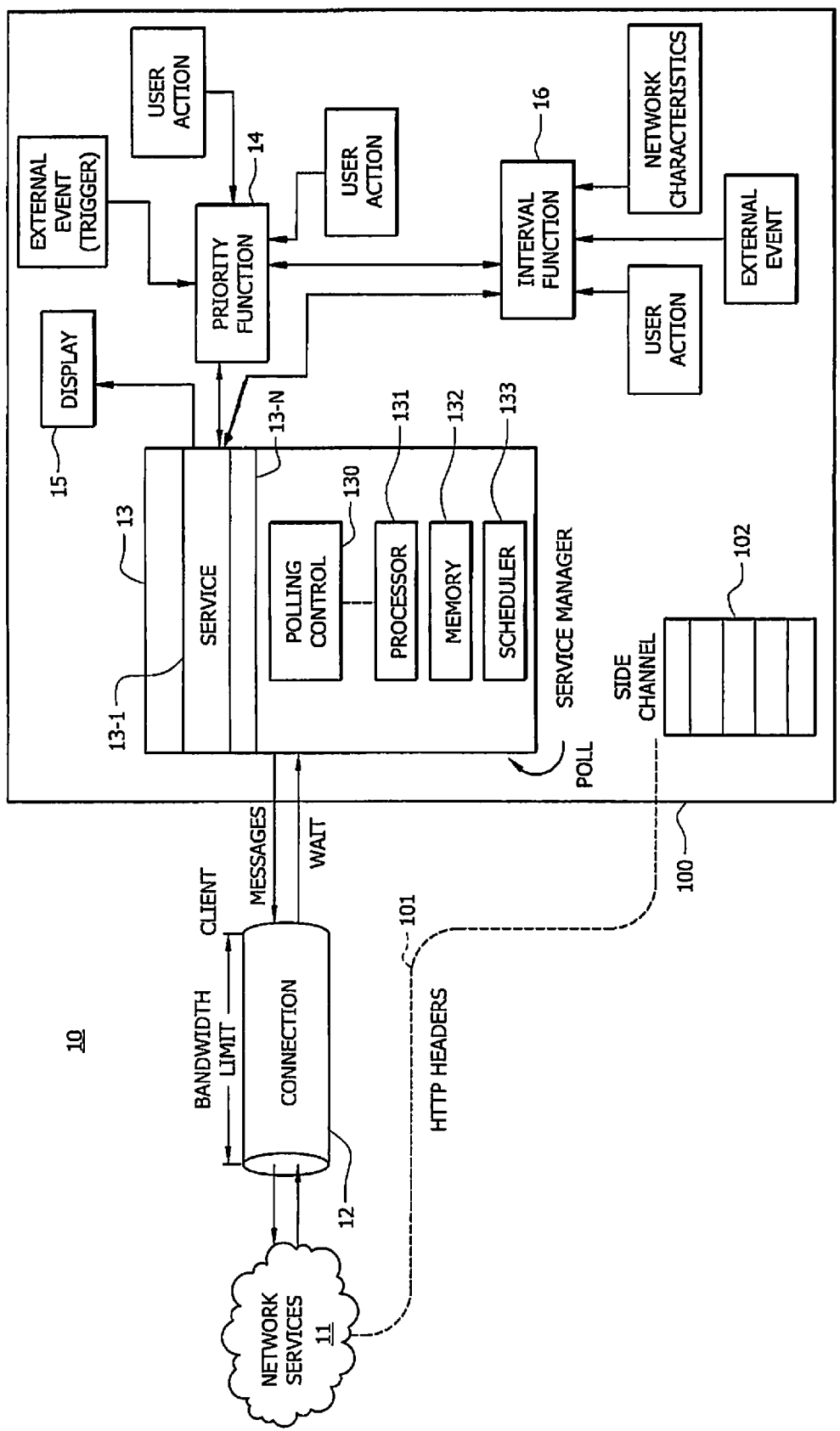
FIG. 1 shows one embodiment of a mobile device utilizing the concepts of the invention.

FIG. 1 shows one embodiment 10 of a mobile device 100 (only a portion of which is illustrated) utilizing the concepts of the invention. Connection 12 exists between device 100 and network server 11. Connection 12 has a bandwidth limitation, either imposed by the physical network or imposed by the user such that the user is only willing to pay for a certain amount of data transmission (often measured in bytes per unit time). Sometimes the cost per byte is less expensive at certain times (such as at night) so the user prefers to use "night" bytes instead of "day" bytes when possible. In fact, many kinds of limitations exist and may be addressed by various embodiments of the invention. For example, there are utilization limitations assigned by networks (WiFi, Edge, UMTS, etc.), user assigned limits (e.g., to control costs), network operator assigned limits, application/service assigned limits, and the like, all of which may be addressed by one or more embodiments.

Device 10 contains service manager 13 which in turn controls various services (or data types) 13-1 to 13-N. Each of the services 13-1 to 13-N has associated therewith a priority function 14. The purpose of each service 13-1 through 13-N is to perform a particular function (application) that ultimately results in data displayed to the user via display 15. Each service 13-1 through 13-N requires some time (bandwidth) on the wireless interface and service manager 13 balancing each bandwidth request against all other service bandwidth requests against a number of factors. The priority of each service is incorporated into the priority function for each service. Since the overall connection has a bandwidth limit, the availability of the connection to any particular service is balanced across all services according to an individual priority function associated with each service. Since the output of the priority function for a given service can change from time to time (as well as the function itself), the use of the connection is dynamically balanced according to a complex and changing set of criteria, which may include user load patterns, behavior, or any characteristic or behavior expressed by the user (direct or through observation) that may be quantified. Thus, the system will indirectly balance itself in accordance with each user's needs and desires. This adaptation can use a variety of functions, such as, for example, linear, moving average, digital filter (FIR, IIR), Bayesian or support vector machine and can support active, adaptive or designed balancing or combinations thereof.

For example, assume a user desires to use only one megabyte per day. That megabyte is rationed out in some order during the day according to a plan for that user. The plan can, for example, be based on statistics or any stochastic process, for example, selecting a service to run (out of multiple services) for the current interval based on a number or value associated with that service, the value of which is determined dynamically according to a function as described. This function may be different for different services or for different users, or on any one of many other techniques, such as, for example, probability of usage of target application or data, neural network, location-based function, GPS.

In a system with scarce resources (e.g., bandwidth), there will typically be multiple competing services at any one interval. As the number of resources increases and the number of services stays the same, competition at any given interval decreases. Systems may be managed by using techniques that modify the interval for a given service and/or alter the instantaneous priority (the priority during the current interval). Both of these values are produced through a function that may operate according to multiple techniques and consider complex criteria. In many systems, there is not a single function for calculating all priorities and intervals, but rather a separate function may be employed on each type of service (or each individual service) and may vary by application and user. The air transport time is then rationed at so many megabytes per hour, if desired. The service manager then will only allow the connection to be used up to the threshold limit. To accomplish this, the service manager periodically pulls through the list of services that require bandwidth and processes the highest priority service first until it reaches the bandwidth limit set for the connection. The service manager then waits until the next pulling interval and repeats the process. The priority functions themselves are constantly changing their priority levels and thus at each polling opportunity the highest priority functions are served first. The services are also changing their polling intervals at each opportunity in concert or independently with the changes in priority.

For example, assume that a user desires to have a weather application, a news application and a sports application. The weather application may have a high priority assigned to it during the hours of 6 AM to say 9AM. Thus, during these hours the weather information is updated every, say ten minutes. Likewise, the news application has a high priority in the morning but then switches so that only "breaking" news stories are reported during the day. The sports application has a priority such that scores are reported only at 6 AM and then again only at 10 PM, except that when a favorite team (or teams) are actually playing then the priority changes to every five minutes.

Another example would be when the user performs an action, such as pressing a key or changing the view on the display. This action then could immediately change the priority function of the associated application (service). This then would allow the service manager to control updates on a more immediate basis.

Many wireless devices, such as for example, cellular telephones, allow communications over several channels, One such channel is a main two-way real time channel which is typically used for concurrent bidirectional speech communications. Another channel, for example, is a data channel that could be used separately from the speech channel. While the concepts discussed herein can be used on either channel, it is expected that the service manager will use the data channel. During the time the service manager is managing the connection, there can be a side channel of HTTP headers, such as headers 101. These side channel headers piggyback on other messages. For instance, if service A is communicating with server 11, service B can also communicate with the server at the same time on the same message using a side channel message such as message 102.

The purpose of the side channel is to process certain class of service requests that are small but frequent or potentially frequent, but where it is not necessary to establish an explicit transaction on the network. Thus, when one service makes a request and gets a response, several other services can have their small but important requests multiplexed on the established requests so that they effectively share that time slice. An example would be for an application to check for the presence of an update such that if an update exists (i.e. there is a "flag" set). Thus, the flag message can serve to allow time to be scheduled for the actual updating of the application.

Note that while FIG. 1 shows a single manager and only one connection, in actuality there can be many connections, each with a service manager. In one embodiment, each connection is to a separate URL and thus there is a one to one relationship between the service manager and a connection. In this embodiment, all services which connect to the same host (URL) are associated with the same single service manager and with the same connection. In this manner when processing service requests, the system can connect to the same host and port and thus the connection can be opened only once for all the applications that communicate with the same server. This reduces the overhead of the communication by leaving the socket open for multiple services. In turn, this reduces battery usage because the device radio is used less.

Another example of dynamic function changing is when messages are being sent back and forth to another mobile device. The user then wants the message sending and receiving service to have a high priority during this exchange but then also wants that priority to taper off over time as the conversation dies so that the device does not use up a lot of network bandwidth checking for messages. The priority function could be anything that is reset by user actions. Examples of priority changes are: periodic, constant, decreasing priority, increasing priority.

Another example would be using statistics about times when network access has been accomplished or when things are available. This would work well for applications that change over time, such as a traffic map. The priority function would track and the changes in traffic patterns during, for example, rush hours and could therefore dynamically increase and decrease it's priority assigned to updating the information from the server.

The priority could be tailored to usage. For instance, if the user always begins his/her day by looking at the traffic information, then checking the news and then looking at the weather icon on the display. These items can be clustered to update as a group. Using this arrangement, the system might be a little late on traffic, but will be ahead on the other services in that group. For a flight icon (tile), for instance, one of things that affects the priority might be the proximity in time to the flight. As the flight time approaches, the priority can go higher for updating departure and gate information. The system might update once a day when the flight is a couple of days out, and then start updating at, say, 15 minute intervals, when it is within a few hours of flight time.

Also, the system might have a flight tile that contains several airlines on it. When the tile is selected the system could determine which airline has the highest priority from the several possible airlines on the tile with the priority based on calendar information available to the system. Thus, if the user is booked on an American Airlines flight the user probably does not need an update of Continental flights at that point in time.

Thus, by having access to other information, the priority of the information into the phone can be managed consistent with reducing bandwidth and battery drain in order to give the user increased value from the device. Thus, when it is snowing outside, the phone could sound an alarm earlier than normal to alert the user to longer commute times based on the knowledge of the weather and the user's calendar of scheduled activities.

Alternatively to, or in addition to, priority functions (e.g., function 14), embodiments of the present invention employ interval functions, such as interval function 16. For example, system 10 uses interval function 16 to manage services 13-1 to 13-N as they communicate over connection 12 by setting the intervals at which they update. Many embodiments manage the setting of updating intervals dynamically—that is, as each of services 13-1 to 13-N execute on the client's processor. For example, interval function 16 can be programmed to set an updating interval for a service each time the given service runs or each time a user accesses the given service. Service manager 13 then uses then controls the update requests according to the set intervals.

The calculation of the interval is based on one or more factors. For instance, factors such as user behavior, network characteristics, time of day, day of week, hours of operation, battery charge level, and the like may be used to set an interval for a service. For instance, for a stock feed service, interval function 16 would not request the feed after 4:00 P.M., since stock prices in most US markets are not updated after that time. However, during business hours, the updating interval may be based on other factors, including user preference, availability of updates, availability of network bandwidth, and the like.

A factor that is often important in some embodiments is network characteristics, such as price for data transfer, type of network, and home/roaming status. For instance, when a user is roaming, especially internationally, prices for use are much, much higher compared to typical home and domestic prices. Thus, a user typically does not want to use a roaming network abroad, but the same user would typically want to take advantage of the network if the device was tethered to a wire connection or running WiFi (IEEE 802.11 standard). Interval function 16 detects network characteristics and sets intervals in light of such factors. For example, interval function 16 may lengthen intervals or stop all automatic updating when roaming, while enabling automatic updating and/or shortening intervals when connected to a Local Area Network (LAN, such as may employ Ethernet, WiFi, WiMax, and/or the like).

In fact, any of the parameters that can be used to set priority (as described above) can also be used by some embodiments to set updating intervals. Factors that result in priority being increased can also be used to shorten updating intervals, while factors that result in priority being lowered may be used to increase updating intervals. Such factors include, e.g., user action, type of application (e.g., news, weather, traffic, flight information), proximity to user commitment (e.g, flight departure), and the like. Further, priority levels can even be used to assign updating intervals, since priority levels are often good indicators of application importance and relevance at a given time.

As shown in FIG. 1, interval function 16 exists on mobile device 100. Thus, the setting of the update intervals is performed on the client side rather than on the server side in the illustrated example. Client-side interval functions have not been provided in the prior art, due at least in part to an accepted belief that all complex calculations should be performed on servers rather than on handheld devices. This belief has arisen mostly because of limited processing power of handheld devices that caused decreases in user performance as more processing power was consumed. However, very recent trends in hardware have allowed more processing to be performed on handheld devices.

Embodiments of the invention provide one or more advantages over prior art systems. For instance, an advantage of performing interval and priority setting on client devices is that it allows intervals and priorities to be set using local user context. For instance, a user's device often "knows" if a user is roaming, whereas a server on the Internet may not be aware that the user is roaming. Thus, a client-side interval function (e.g., interval function 16) can dynamically set update intervals in response to roaming status, thereby providing a user with greater cost efficiency.

While interval function 16 is shown in FIG. 1 as assigning intervals to each of services 13-1 to 13-N, it should be noted that some embodiments may include one interval function as part of each respective service. For example, some embodiments include interval functions 16-1 through 16-N (not shown), each being part of its respective service 13-1 to 13-N. Embodiments of the invention can use either configuration.

Further, some embodiments include only interval function 16, while other embodiments, such as the one shown in FIG. 1, include both priority function 14 and interval function 16. Embodiments that employ both of priority function 14 and interval function 16 are possible because priority and update intervals are concepts that are complementary, rather than being mutually exclusive. Generally, updating intervals are different from priority settings in various ways. For example, priority settings are usually used to determine which service goes first when two or more services are scheduled to make a request at or near the same time. By contrast, updating intervals determine, at least in part, how often a service makes requests for information.

Typically, priority is more important when there are a number of services that are executing and updating at the same time. Priority can be used to determine which services make their requests first. On the other hand, if there are not a lot of services on a device, then one or more interval functions can stagger the service intervals in time so that the services will not conflict. Further, in a device with many services, an update interval function can provide a way to manage bandwidth use.

Figure 2:
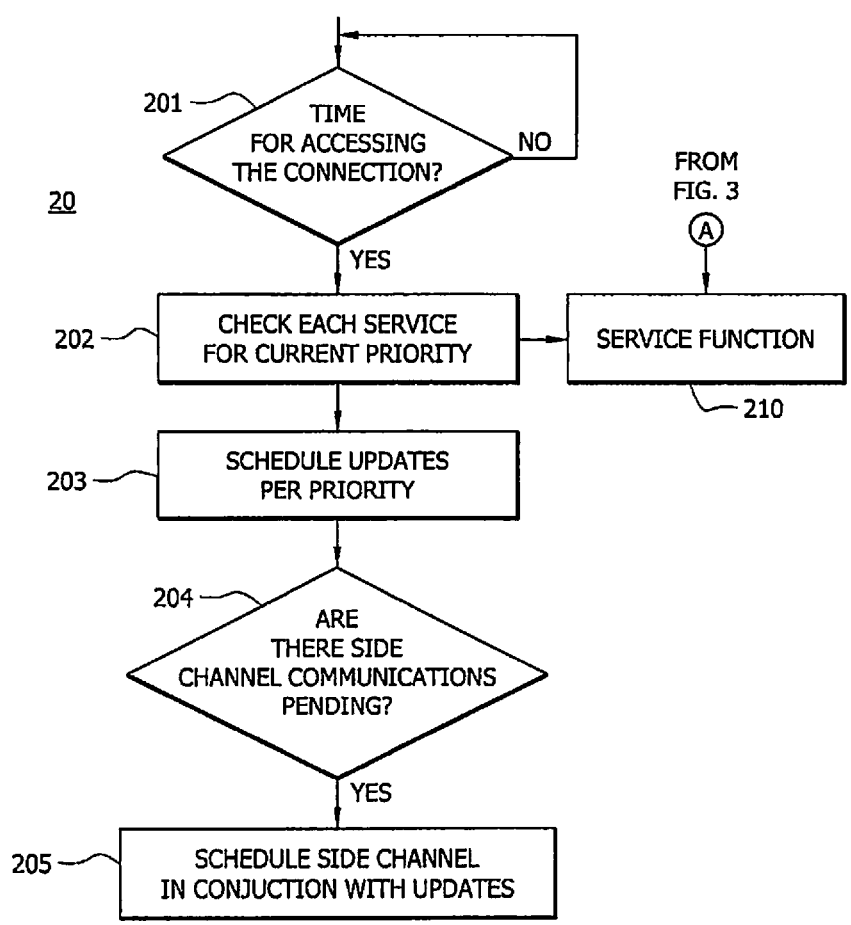
FIGS. 2 and 3 show embodiments of methods for controlling the operation of the application update function of the device shown in FIG. 1.
Figure 3:
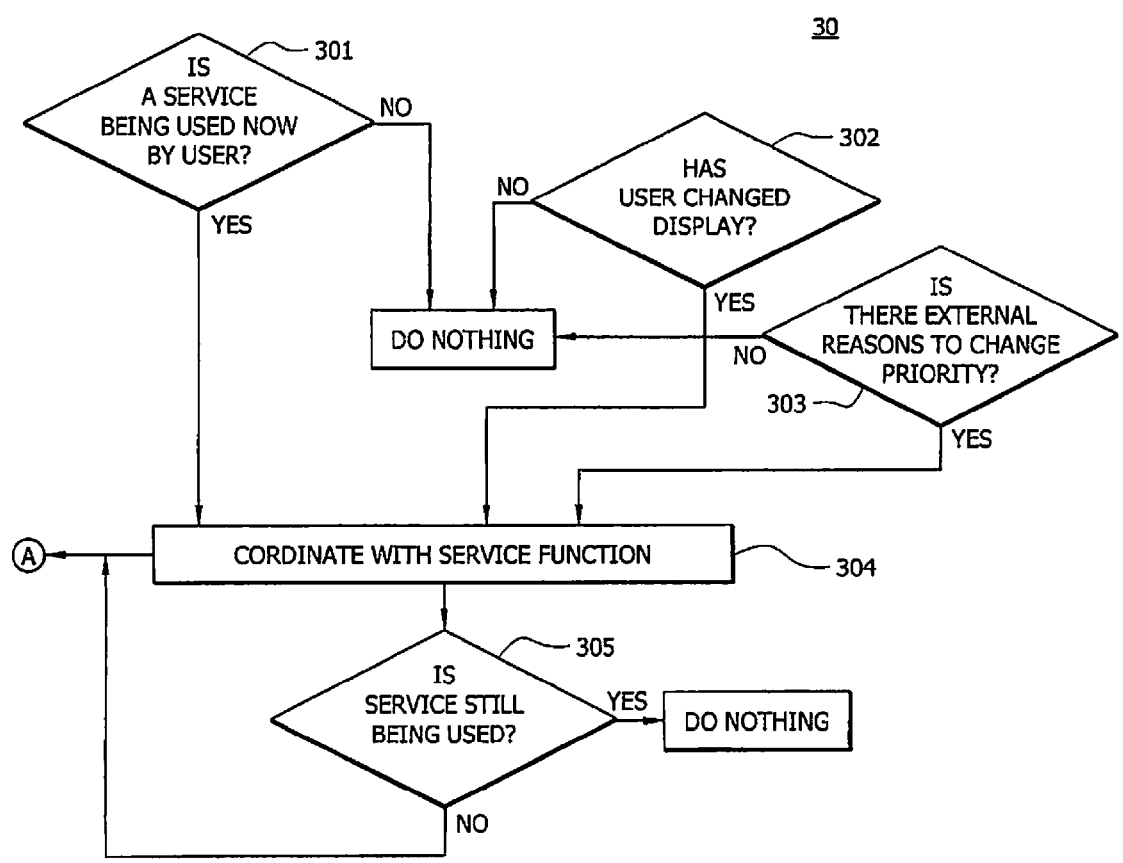

FIGS. 2 and 3 show embodiments of methods for controlling the operation of the application update function of the device shown in FIG. 1. In FIG. 2, embodiment 20 begins with process 201 determining if it is time for accessing a particular network server for those applications which rely on that server for updated information. This time is determined by a combination of calculations based on current battery level, time of day, current activity of the user with respect to the device, how long it has been since the last access to the server, how much data has already been transmitted in a given unit of time, etc. When it is time to make an access, then process 202 checks each service to determine relative priority of that application and then based on the relative priority and the available bandwidth for that connection, as determined by process 201, working in conjunction with process 210, one or more applications are updated by process 203.

Process 204 determines whether there are side channel communications that need to occur, and if so, process 205 schedules those communications.

Processes 301, 302 and 303 of embodiment 30, as shown in FIG. 3, are examples of processes that determine if a priority is to be changed at a particular time. Thus, process 301 determines if a service is being used by the user, process 302 determines if the user has changed the display (for example, by selecting a tile, or a particular service within a tile); and process 303 determines if there is some external reason to change priority. Such an external reason could be, for example, a breaking news story, a sports event going into overtime, weather conditions turning hazardous, etc.

Process 304 then coordinates this information with process 210, as shown in FIG. 2, so as to change the priority of the service. Process 305 determines when a user has stopped using a service. For example, instant messaging is finished and thus the priority for that service can return to its normal priority level. Note that the examples discussed above are only a few of the many factors that can change priority on a dynamic basis and in many situations multiple factors are used to determine relative priority and timing for a network server access, all coordinated to conserve bandwidth and battery life for the user. In one embodiment, the operations in the device are controlled by machine executable code running under control of, for example, processor 131.

Figure 4:
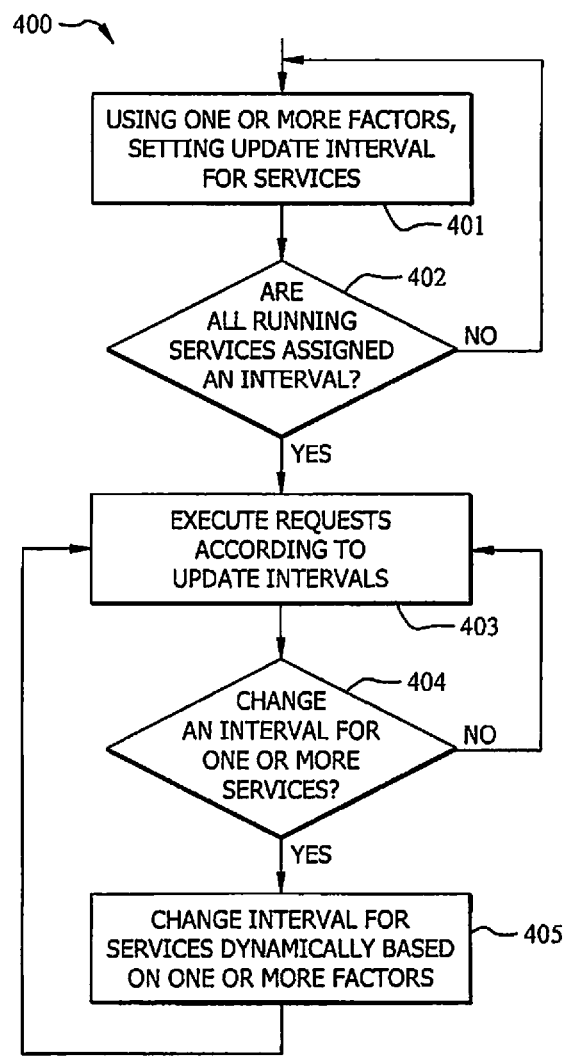
FIGS. 4 and 5 show embodiments of methods for controlling the operation of services according to the interval function of the device shown in FIG. 1.
Figure 5:
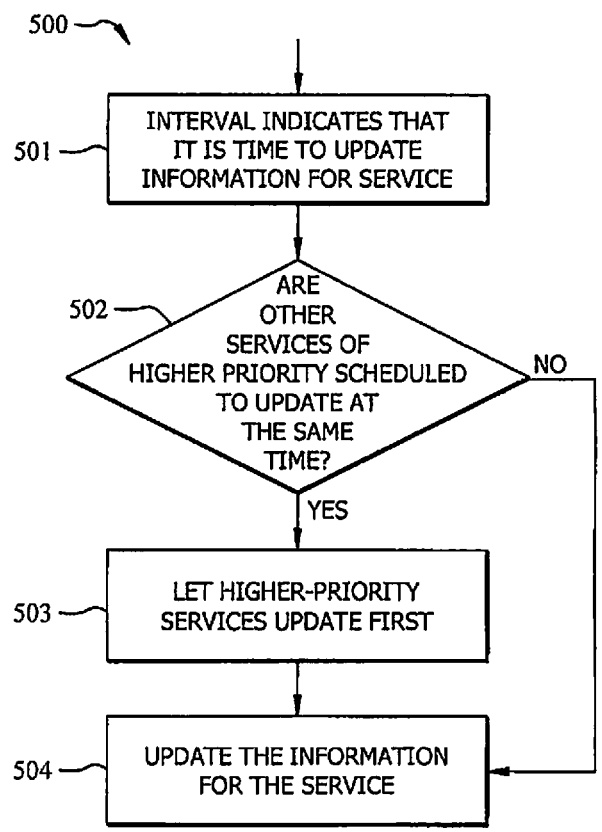

FIGS. 4 and 5 show embodiments of methods for controlling the operation of services according to the interval function of the device shown in FIG. 1. Method 400 is performed, for example, by a handheld device, such as a cellular phone, a handheld computer, an email checking device, a handheld multi-media device, or the like. Specifically, method 400 is performed by a processor on such device as it runs one or more update interval functions (e.g., interval function 16 of FIG. 1).

In step 401, update intervals are set for services on the device using one or more factors. Examples of such factors are discussed above. In the embodiment shown in FIG. 4, the mobile device cycles through all services to assign them update intervals, as shown in steps 401 and 402. However, not all embodiments are limited thereto. Setting updates for a service can be performed at any of a variety of times, such as at boot-up the mobile device, when a service is first run, or any other time.

In step 403, the requests are executed according to the update intervals. For example, some services are updated at different intervals than other services. In step 404, it is determined whether an interval should be changed for one or more services. The interval for a given service can be changed for any of a variety of reasons, including a detected change in one or more factors used to set the intervals (e.g., time of day, roaming status change, etc.), user access of a service, and the like. Step 404 acknowledges that the intervals in various embodiments are set dynamically and change "on the fly" as the mobile device operates. For instance, a mobile device may change intervals for some or all of its services when the device begins roaming.

If there is no reason to change an interval, the method progresses to step 403. If an interval is to be changed, the method progresses to step 405 where the interval is changed based on one more factors. Then, the method progresses to step 403.

Method 400 is exemplary, and other methods within the scope of various embodiments may add, omit, change, or rearrange steps. For instance, as mentioned above, assignments of intervals to services can occur at any of a variety of times during operation of the device. further, steps 401-405 may be repeated throughout operation of the device.

Method 500 is an exemplary method for performing service updates according to both priorities and assigned intervals. Method 500 is performed, for example, by a handheld device, such as a cellular phone, a handheld computer, an email checking device, a handheld multi-media device, or the like. Specifically, method 500 is performed by a processor on such device as it runs one or more update interval functions (e.g., interval function 16 of FIG. 1).

In step 501, it is determined that an interval indicates that information should be updated to a service. In step 502, it is discerned whether other services of higher priority are also set to update at the same time. If so, then the higher-priority services are updated first at step 503. If not, then the service is updated according to the set interval at step 504.

Method 500 is exemplary, and other methods within the scope of various embodiments may add, omit, change, or rearrange steps. For instance, steps 501-504 may be repeated throughout operation of the device, and the set interval may change dynamically.

When implemented via computer-executable instructions, various elements of embodiments of the present invention are in essence the software code defining the operations of such various elements. The executable instructions or software code may be obtained from a readable medium (e.g., a hard drive media, optical media, RAM, EPROM, EEPROM, tape media, cartridge media, flash memory, ROM, memory stick, and/or the like). In fact, readable media can include any medium that can store information.

Figure 6:
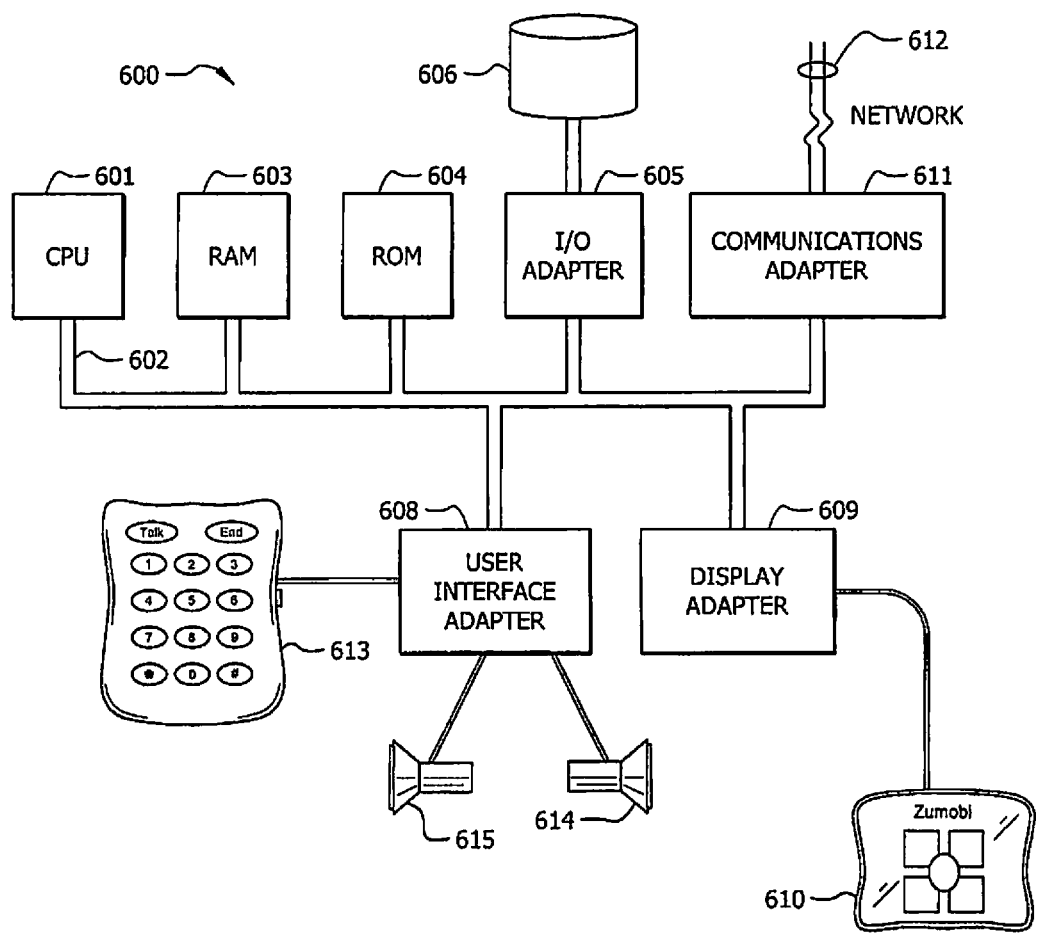
FIG. 6 illustrates an example computer system 600 adapted according to embodiments of the present invention.

FIG. 6 illustrates an example computer system 600 adapted according to embodiments of the present invention. It is understood that computer system 600 conforms to a basic exemplary architecture that is common to processor-based devices, such that computer system 600 comprises an example system on which embodiments of the present invention may be implemented (such the mobile device of FIG. 1). However, it is also understood that specific devices may vary in their architectures and still be encompassed in one or more embodiments of the invention.

Central processing unit (CPU) 601 is coupled to system bus 602. CPU 601 may be any general purpose CPU, special purpose CPU, or even a processor (or chip set) specially adapted for use in mobile devices. However, the present invention is not restricted by the architecture of CPU 601 as long as CPU 601 supports the inventive operations as described herein. CPU 601 may execute the various logical instructions according to embodiments of the present invention. For example, one or more CPUs, such as CPU 601, may execute machine-level instructions according to the exemplary operational flows described above in conjunction with FIGS. 2-5.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, allow a user to interact with computer system 600 in order to input information, such as selection of an application.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing media data. Communications adapter 611 is preferably adapted to couple computer system 600 to network 612 (e.g., the Internet, a LAN, a cellular network, etc.). User interface adapter 608 couples user input/output devices, such as keyboard 613, microphone 614 speaker(s) 615, to computer system 600. Display adapter 609 is driven by CPU 601 to control the display on display device 610 (which may be a touchscreen adapted for use in a mobile device) to, for example, display tiles.

System 600 can be adapted as any of a variety of mobile devices, including, but not limited to, a cell phone, an email device (e.g., a BLACKBERRY device available from Research in Motion), a multi-media device (e.g., an IPHONE, available from Apple Inc.), a personal digital assistant, and the like. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of managing application updates on a mobile device, said method comprising:
   on said mobile device, without user interaction, dynamically setting update intervals for each of a plurality of applications using one or more factors that change over time, the one or more factors including:
      one or more update interval functions associated with a period of time after which each application will be updated and the update intervals are set based, at least upon, known network characteristics, and
      one or more priority functions associated with an importance and relevance of each application, and a priority of each application is changed by a user's actions of using the application, statistics about times when network access has been accomplished, according to usage of the application, clustering in a group, or information from other applications executed by the one or more processors; and
   without user interaction, dynamically adjusting said update intervals on an application by application basis using the one or more update interval functions and the one or more priority functions; and
   retrieving updated application data using one or more channels over a network, said updated application data retrieved according to the assigned update intervals.

2. The method of claim 1 further comprising:
   managing bandwidth usage of said mobile device by adjusting said update intervals.

3. The method of claim 1 further comprising:
   discerning a roaming status of said mobile device; and
   setting said update intervals based, at least in part, on said roaming status.

4. The method of claim 1 wherein said dynamically adjusting said update intervals is based on at least one factor from the list of: known uses for said particular application; time of day; frequency of use of said particular application; bandwidth used for a period of time; battery usage; current device activity; bandwidth limitations over a network connection.

5. The method of claim 1, wherein said retrieving updated application data includes:
   coordinating use of a network connection by staggering said update intervals for said applications to avoid conflicts.

6. A mobile device comprising:
   one or more processors; and
   memory having instructions stored thereon, the instructions, when executed by the one or more processors, cause the processors to perform operations comprising:

without user interaction, dynamically setting and adjusting update intervals for each of a plurality of applications running on the mobile device using one or more factors that change over time, the one or more factors including:
one or more update interval functions associated with a period of time after which each application will be updated and the update intervals are set based, at least upon, known network characteristics, and
one or more priority functions associated with an importance and relevance of each application, and a priority of each application is changed by a user's actions of using the application, statistics about times when network access has been accomplished, according to usage of the application, clustering in a group, or information from other applications executed by the one or more processors; and
retrieving updated application data using one or more channels, wherein the updated application data are retrieved according to the assigned update intervals.

7. The mobile device of claim 6 wherein the one or more factors include: network characteristics, usage patterns, and user activity.

8. The mobile device of claim 6, wherein said one or more update interval functions stagger said update intervals of said services so that update times for said services do not conflict.

9. A non-transitory computer-readable medium having instructions stored thereon, the instructions, when executed by one or more processors, cause the processors to perform operations comprising:
without user interaction, dynamically setting and adjusting update intervals governing when each of a plurality of applications request updated information over a network connection, wherein the dynamic setting and adjusting of the update intervals uses one or more factors that change over time, the one or more factors including:
one or more update interval functions associated with a period of time after which each application will be updated and the update intervals are set based, at least upon, known network characteristics, and
one or more priority functions associated with an importance and relevance of each application, and a priority of each application is changed by a user's actions of using the application, statistics about times when network access has been accomplished, according to usage of the application, clustering in a group, or information from other applications executed by the one or more processors; and
retrieving updated application data using one or more channels over the network connection, wherein the updated application data are retrieved according to the assigned update intervals.

10. The computer-readable medium of claim 1 wherein there are N applications and N update interval functions, and each of said applications corresponds to one update interval function.

11. The computer-readable medium of claim 1 wherein there are N applications and one update interval function.

12. The computer-readable medium of claim 1 wherein the one or more update interval functions stagger said update intervals of said applications so that update times for said applications do not conflict.

13. The non-transitory computer-readable medium of claim 1, wherein the one or more channels include a main two-way real time channel and a side channel.

* * * * *